(12) United States Patent
Kato

(10) Patent No.: US 7,733,383 B2
(45) Date of Patent: Jun. 8, 2010

(54) IMAGE CAPTURE APPARATUS WITH A COLOR PROPERTY CONTROL FUNCTION AND IMAGE CAPTURE PROGRAM

(75) Inventor: Yoshiyuki Kato, Higashiyamato (JP)

(73) Assignee: Casio Computer Co., Ltd., Tokyo (JP)

( * ) Notice: Subject to any disclaimer, the term of this patent is extended or adjusted under 35 U.S.C. 154(b) by 470 days.

(21) Appl. No.: 11/789,607

(22) Filed: Apr. 25, 2007

(65) Prior Publication Data

US 2007/0257992 A1    Nov. 8, 2007

(30) Foreign Application Priority Data

May 2, 2006    (JP) .............................. 2006-128385

(51) Int. Cl.
  *H04N 9/73*    (2006.01)
  *H04N 5/222*    (2006.01)
(52) U.S. Cl. .................................. 348/224.1; 348/371
(58) Field of Classification Search ............. 348/223.1, 348/224.1, 225.1, 227.1, 228.1, 370, 371
  See application file for complete search history.

(56) References Cited

U.S. PATENT DOCUMENTS

| | | | | |
|---|---|---|---|---|
| 5,550,587 A | * | 8/1996 | Miyadera | 348/223.1 |
| 6,693,673 B1 | * | 2/2004 | Tanaka et al. | 348/371 |
| 7,148,922 B2 | * | 12/2006 | Shimada | 348/224.1 |
| 7,404,652 B2 | * | 7/2008 | Ng et al. | 362/231 |
| 7,432,972 B2 | * | 10/2008 | Lee et al. | 348/333.02 |
| 2002/0025157 A1 | * | 2/2002 | Kawakami | 396/155 |
| 2007/0257992 A1 | * | 11/2007 | Kato | 348/223.1 |

FOREIGN PATENT DOCUMENTS

CN    1334485 A    2/2002
JP    2003-299108 A    10/2003

OTHER PUBLICATIONS

Chinese Office Action (and English translation thereof) dated May 9, 2008, issued in a counterpart Chinese Application.

* cited by examiner

*Primary Examiner*—Jason Chan
*Assistant Examiner*—Nicholas G Giles
(74) *Attorney, Agent, or Firm*—Frishauf, Holtz, Goodman & Chick, P.C.

(57) ABSTRACT

Color temperature is calculated on the basis of image data captured by a CCD. An appropriate exposure value is calculated on the basis of a brightness component of the image data. It is determined whether or not LEDs should emit auxiliary lights to obtain the appropriate exposure value. When it is determined that the LEDs are required to emit, light quantity of the combined light to be emitted by the LEDs is calculated. The light quantities of the respective LEDs are set such that the emission ratio of the LEDs corresponds to the calculated color temperature. The LEDs emit the lights at the set light quantities. The captured image is adjusted based on the calculated color temperature.

13 Claims, 5 Drawing Sheets

IMAGE CAPTURE APPARATUS WITH A COLOR PROPERTY CONTROL FUNCTION AND IMAGE CAPTURE PROGRAM

CROSS-REFERENCE TO RELATED APPLICATIONS

This application is based upon and claims the benefit of priority from prior Japanese Patent Application No. 2006-128385, filed May 2, 2006, the entire contents of which are incorporated herein by reference.

BACKGROUND OF THE INVENTION

1. Field of the Invention

The present invention relates to an image capture apparatus with a color property control function and an image capture program.

2. Description of the Related Art

Conventionally, when capturing an image in a place where a sufficient light cannot be provided, appropriate brightness is obtained by emitting an auxiliary light (flash for still image, movie light for moving image). When capturing an image by use of the auxiliary light, the light incident to an image capture apparatus is a combination of ambient external light irradiating an object and the auxiliary light. A color property of a captured image is affected by the auxiliary light. For example, the color temperature calculated from the captured image data coincides with the color temperature of the combined light of the external light and the auxiliary light but does not coincide with the color temperature only of the external light. Therefore, color correction such as white balance processing may not be performed appropriately.

The color property of the flash light varies as time advances. Jpn. Pat. Appln. KOKAI Publication No. 2003-299108 discloses a technique to obtain an image of an object with a desired color by adjusting an exposure start time and an exposure termination time (accumulation time) so as to make the color property of the flash light become the same as the color property of the external light.

However, according to the foregoing technique, to obtain the desired color property, the accumulation time is restricted and appropriate exposure may not be realized. Changing sensitivity of an image sensor enables obtaining the desired color property by compensating underexposure, but processing becomes complex.

The technique given above can be applied to momentary emission such as the flash light, but cannot be applied to lasting emission such as the movie light for capturing moving image.

BRIEF SUMMARY OF THE INVENTION

An object of the present invention is to provide an image capture apparatus and an image capture program capable of controlling easily a color property of a light emitting element.

According to an embodiment of the present invention, an image capture apparatus comprises:

an image capture unit configured to capture an image of an object and output image data;

a light emitting unit including light emitting elements configured to respectively emit lights of different colors;

a calculation unit configured to obtain a color property of a light source irradiating the object;

a first emission controller configured to control light emission emitted by the light emitting unit such that a color property of the light mission matches the color property obtained by the calculation unit; and a white balance unit configured to perform white balance adjustment such that white balance of the image data output from the image capture unit is adjusted based on the color property obtained by the calculation unit.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which.

DETAILED DESCRIPTION OF THE INVENTION

An embodiment of an image capture apparatus applied to a digital camera according to the present invention will now be described with reference to the accompanying drawings.

First Embodiment

Figure 1:
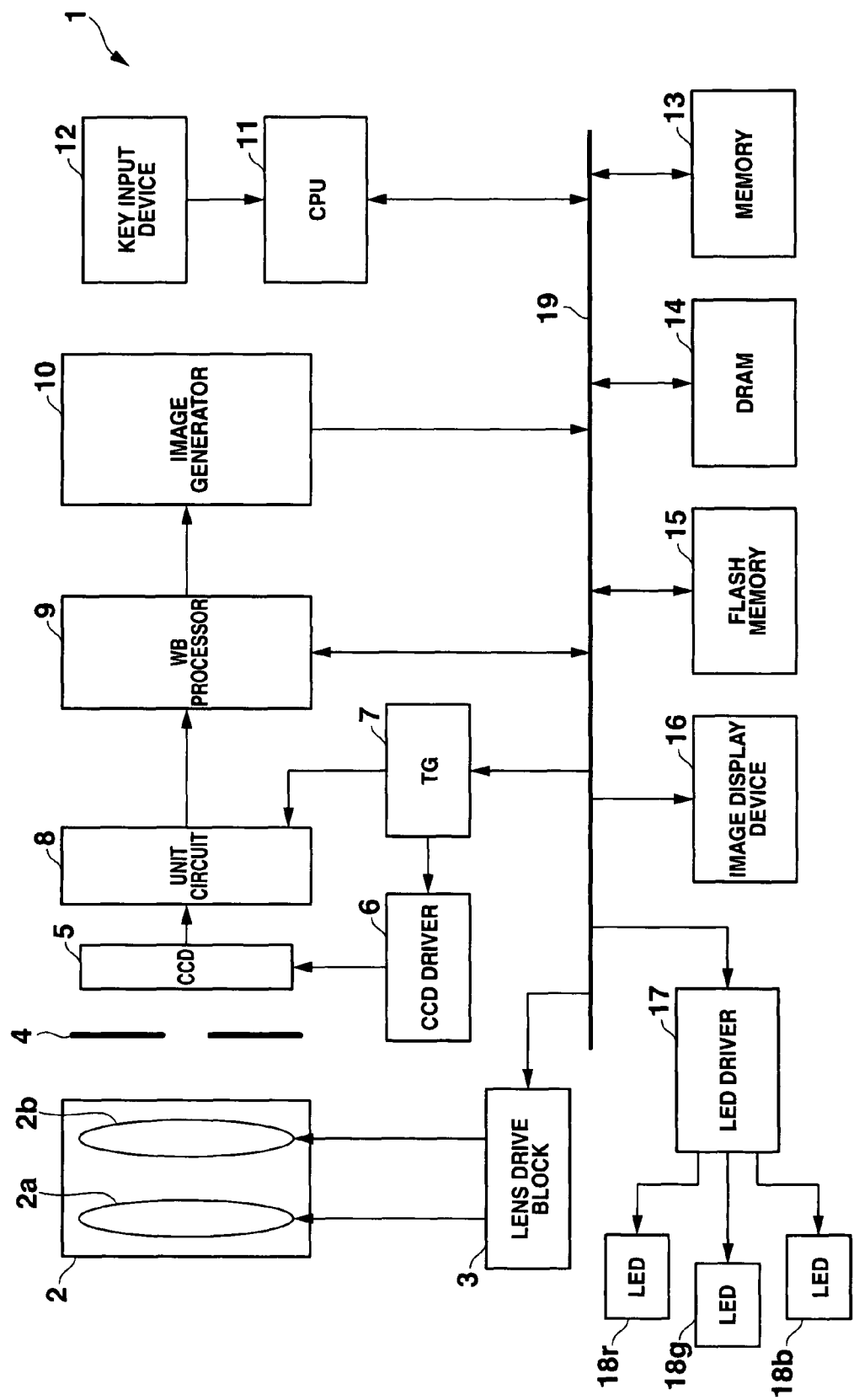
FIG. 1 is a block diagram of a digital camera 1 according to embodiments of the present invention.

FIG. 1 is a schematic block diagram showing an electric configuration of a digital camera 1.

The digital camera 1 includes a lens system 2, a lens drive block 3, an aperture 4, a charge coupled device (CCD) 5, a CCD driver 6, a timing generator (TG) 7, a unit circuit 8, a white balance (WB) processor 9, an image generator 10, a central processing unit (CPU) 11, a key input device 12, a memory 13, a dynamic random access memory (DRAM) 14, a flash memory 15, an image display device 16, a light emitting diode (LED) driver 17, LEDs 18 (LED 18r, LED 18g and LED 18b), and a bus line 19.

The lens system 2 includes focus lenses 2a and zoom lenses 2b. The lens drive block 3 is connected to the lens system 2. The lens drive block 3 includes a focus motor, a zoom motor, a focus motor driver, and a zoom motor driver (not shown). The focus motor moves the focus lenses 2a along an optical axis, and the zoom motor moves the zoom lenses 2b along the optical axis. The focus motor driver and the zoom motor driver respectively drive the focus motor and the zoom motor in response to a control signal supplied from the CPU 11.

The aperture 4 includes a drive circuit (not shown). The drive circuit drives the aperture 4 in response to a control signal supplied from the CPU 11.

The aperture 4 is a mechanism to adjust a quantity of incident light from the lens system 2.

The CCD 5 is driven by the CCD driver 6 at a predetermined period. The CCD 5 performs photoelectric conversion on light intensity of an optical image of an object. The CCD 5 is equipped with a Bayer filter, and the captured image signal subjected to the photoelectric conversion is output to the unit circuit 8 as an RGB signal. The CPU 11 controls the operation timing of the CCD driver 6 and the unit circuit 8 through the TG 7. The CCD 5 also functions as an electronic shutter. The shutter speed of the electronic shutter is controlled by the CPU 11 through the CCD driver 6 and the TG 7.

The unit circuit 8 is connected to the TG 7. The unit circuit 8 includes a correlated double sampling (CDS) circuit, an automatic gain control (AGC) circuit, and an analog-to-digital converter. The CDS circuit removes the noise contained in the captured image signal output from the CCD 5 by correlated double sampling. The AGC circuit performs automatic gain control on the captured image signal subjected to the sampling. The analog-to-digital converter converts the analog captured image signal subjected to the automatic gain control into a digital image signal. Namely, the captured image signal (RGB signal) output from the CCD 5 is converted to the digital image signal (digital RGB signal) by the unit circuit 8 and transmitted to the WB processor 9.

The WB processor 9 includes a color temperature calculator and a signal amplifier. The WB processor 9 performs white balance processing. The color temperature calculator detects an RGB ratio "R:G:B" of the digital RGB signal sent from the unit circuit 8. The color temperature calculator calculates the color temperature on the basis of the RGB ratio. The signal amplifier amplifies the RGB signal according to RGB gains which are set based on the calculated color temperature. The amplified image signal is output to the image generator 10. The technique to calculate the color temperature and the technique to perform the white balance processing are commonly known, and explanation for the techniques will be omitted.

The image generator 10 performs image processing to improve image quality, such as γ correction, on the captured image signal (image data) sent from the WB processor 9, and converts the processed captured image signal into a luminance (Y) signal and a color difference (UV) signal. The YUV data signal is temporarily stored in the DRAM 14 under the control of the CPU 11. In an image capture mode, every time a frame of the image data is stored in the DRAM 14, the frame of the image data is converted into a video signal, and the video signal is sent to the image display device 16 to be screen-displayed as a through image.

The CPU 11 is a single-chip microcomputer to control the components of the digital camera 1, and includes a clock circuit for time measurement. The CPU 11 controls compression and decompression of image data. The CPU 11 compresses the image data processed by the image generator 10 and temporarily stored in the DRAM 14. The CPU 11 stores the compressed image data in the flash memory 15 as an image file in a predetermined format (for instance, JPEG or MPEG format).

The CPU 11 controls a variety of processing for image capture such as auto exposure (AE) processing and the like.

Further, the CPU 11 controls emissions of the LEDs 18. That is, the CPU 11 calculates a combined light quantity L to be generated by the LEDs 18, and sets light quantities to be emitted by the respective LEDs 18r, 18g, and 18b. The setting of the light quantities of the LEDs 18r, 18g, and 18b is performed based on the color temperature calculated by the WB processor 9.

The key input device 12 includes a variety of operation keys, such as a shutter button, a mode switching key, a menu key, a cross key, a SET key, a zoom key (telephoto key, wide-angle key). The key input device 12 outputs an operation signal to the CPU 11 depending on a key operation by a user.

The memory 13 stores control programs and data required for the CPU 11 to control the components of the digital camera 1 (for example, a control program necessary for the emissions of the LEDs 18). The CPU 11 reads out a control program and performs operation according to the read-out program.

The DRAM 14 is used as a buffer memory. The CPU 11 controls the DRAM 14 to temporarily store the image data which is captured by the CCD 5 and processed by the unit circuit 8, the WB processor 9, and the image generator 10. In addition, the DRAM 14 is used as a working memory for the CPU 11.

The flash memory 15 is a nonvolatile memory which is housed in the digital camera 1 or freely attached thereto and detached therefrom. Still image data captured and compressed in a still image capture mode is stored in the flash memory 15. Moreover, moving image data captured and compressed in a moving image capture mode is stored in the flash memory 15.

The image display device 16 includes a color liquid crystal display (LCD) and a drive circuit of the LCD. In the image capture mode, when the digital camera 1 is in a standby status, the image display device 16 displays an image of an object captured by the CCD 5 as a through image or a finder image. In a playback mode, the CPU 11 reads out recorded image data from the flash memory 15 and decompresses the image data. The display device 16 displays the decompressed image data.

The LED driver 17 controls the LEDs 18 (LED 18r, LED 18g, and LED 18b) to start or end the emissions based on a control signal transmitted from the CPU 11. The LED 18r emits red light, the LED 18g emits green light, and the LED 18b emits blue light. The LEDs 18 function as a source of movie lights.

When emitting the LEDs 18r, 18g, and 18b, the LED driver 17 also adjusts (controls) light quantities of the respective emissions. The light quantity of the red light generated by the LED 18r is represented by Lr. The light quantity of the green light generated by the LED 18g is represented by Lg. The light quantity of the blue light generated by the LED 18b is represented by Lb. Varying the currents of the LEDs 18 may adjust the light qualities of the LEDs 18. Controlling the currents enables adjustment of an emission ratio "Lr:Lg:Lb" of the red, green, and blue light emissions. The combined light quantity L indicates the light quantity of the combination of the emissions by the LEDs 18r, 18g, and 18b.

The LEDs 18 are provided on the digital camera 1 such that the lights emitted by the LEDs 18 can irradiate the object. That is, the LEDs 18 are arranged on the same face as the face on which the lens system 2 of the digital camera 1 is provided.

Figure 2:
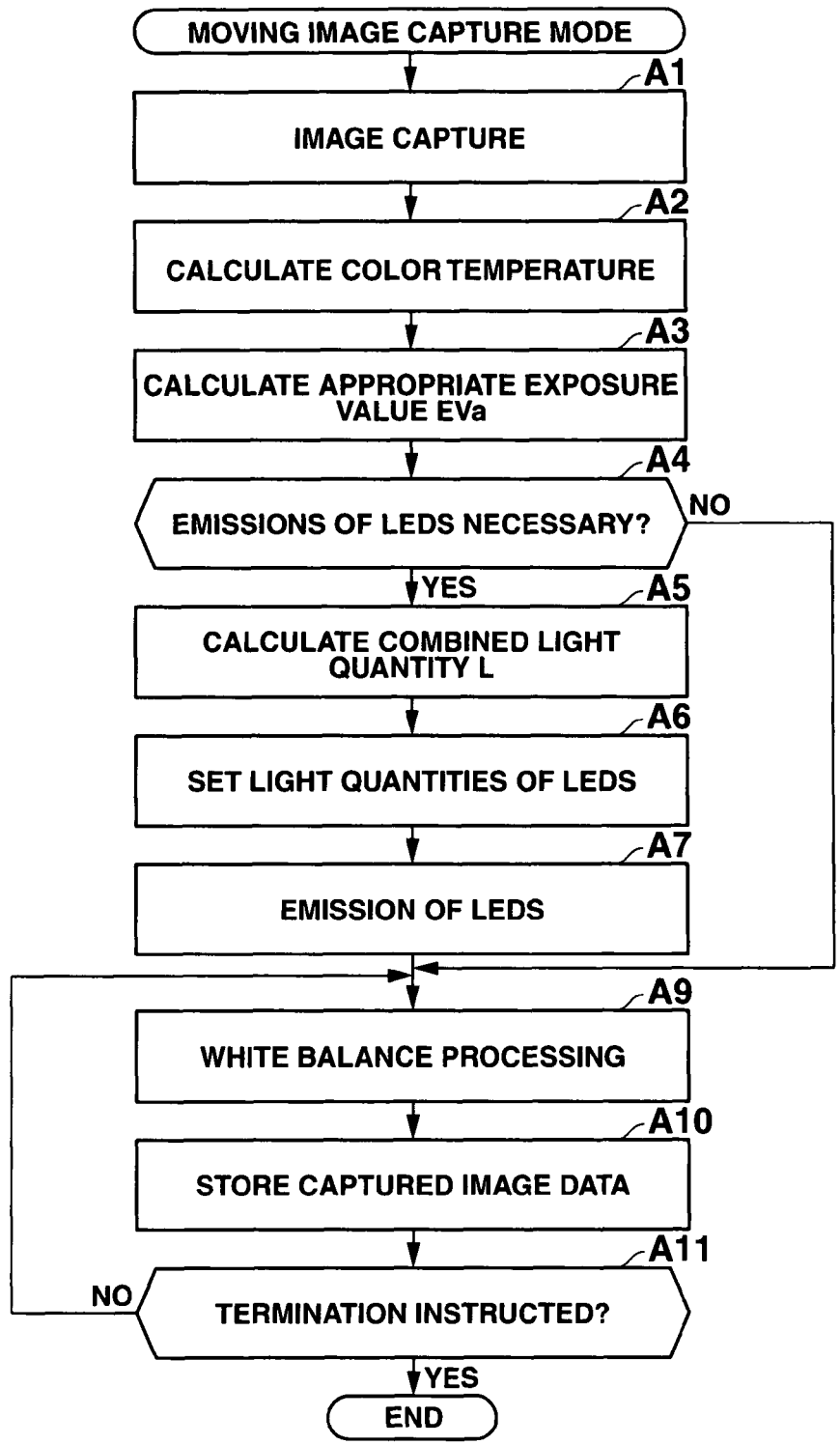
FIG. 2 is a flowchart illustrating moving image capture processing of the digital camera 1 according to the first embodiment.

FIG. 2 is a flowchart illustrating moving image capture processing according to the first embodiment.

When a user instructs to capture a moving image, frames of image data are captured without the light emissions of the LEDs 18, and the image data is displayed on the image display device 16 as a through image (step A1). The CCD 5 captures the image of the object, and the unit circuit 8 converts the captured image data into a digital signal.

A color temperature is calculated from the captured image data which is converted into the digital signal by the unit circuit 8 (step A2). The color temperature calculator of the WB processor 9 detects the RGB ratio (R:G:B) of the RGB components included in the captured image data and calculates the color temperature based on the RGB ratio. The calculation of the color temperature is a well known technique, and the description in detail will be omitted. However, obtaining chromaticity coordinates from the RGB signal, and calculating the color temperature from the obtained chromaticity coordinates is a possible approach. Thereby, the color temperature of the external light irradiating the object is obtained.

The CPU 11 calculates an appropriate exposure value based on the brightness (Y) component of the YUV data which is output from the image generator 10 which converts the input captured image data to the YUV data (step A3). The CPU 11 sets a shutter speed, an aperture, and the like according to the calculated appropriate exposure value EVa. If the shutter speed and the aperture obtained based on the calculated appropriate exposure value Eva is not within a settable range, the upper limit or the lower limit value of the settable range is set to the shutter speed and the aperture.

The CPU 11 determines whether or not the emissions of the LEDs 18r, 18g, 18b are required to obtain the calculated appropriate exposure value EVa (step A4) with reference to the set shutter speed and the set aperture. In step A4, it is determined whether or not an exposure value EVb obtained based on the set shutter speed and the set aperture is equal to the appropriate exposure value EVa.

When it is determined that the exposure value EVb obtained based on the set shutter speed and the set aperture is equal to the appropriate exposure value EVa, the CPU 11 determines that the light emissions by the LEDs 18 are not necessary (NO in step A4). When it is determined that the light emissions by the LEDs 18 are not required, the flow advances to step A9 to perform a white balance processing.

When it is determined that the light emissions of the LEDs 18r, 18g, and 18b are necessary (YES in step A4), the CPU 11 calculates the combined light quantity L of the combination of emissions by the LEDs 18 (step A5). The exposure value EVb realized by the set shutter speed and the set aperture is subtracted from the appropriate exposure value EVa calculated in step A3. The combined light quantity L is calculated depending on the subtraction result.

The respective light quantities Lr, Lg, and Lb of the LEDs 18 are set (step A6). The setting of the light quantities Lr, Lg, and Lb is performed such that the emission ratio "Lr:Lg:Lb" coincides with the RGB ratio "R:G:B" detected at step A2 and such that the combination of the light quantities Lr, Lg and Lb coincides with the combined light quantity L calculated at step A5.

The LED driver 17 causes the LED 18r, 18g, and 18b to respectively emit the lights at the set light quantities Lr, Lg, and Lb, under the control of the CPU 11 (step A7). Namely, the light emissions by the LEDs 18 are controlled such that when the red, green and blue lights emitted by the LEDs 18r, 18g, and 18b are combined, the combination of the lights comes to have the same color property as the color property of the external light irradiating the object without the emissions of the LEDs 18. Therefore, the white balance processing is not affected by the emissions of the LEDs 18.

The white balance processing is executed on the captured image data (step A9). The signal amplifier in the WB processor 9 amplifies the RGB signal according to the RGB gains set based on the calculated color temperature. Since the color property of the combined lights emitted by the LEDs 18 coincides with the color property of the external light, the auxiliary light (emissions of the LEDs 18) does not affect the color property of the captured image data.

The image data subjected to the white balance processing is sent to the image generator 10 to be converted into the YUV data, and temporarily stored in the DRAM 14 (step A10).

Until the user instructs the termination of the moving image capture processing (YES in step A11), the processing from step A9 to step A10 are repeated.

As mentioned above, in the present embodiment, the color property of the external light irradiating the object is calculated on the basis of the image data captured by the CCD 5. The light quantities Lr, Lg, and Lb are adjusted such that the color property of the combination of the emissions by the LEDs 18r, 18g, and 18b coincides with the color property of the external light. Therefore, in the case where the auxiliary light (emissions of the LEDs 18) is generated, the color correction (white balance) is not affected by the auxiliary light.

When performing the white balance processing in step A9, the color temperature calculator in the WB processor 9 may newly detect the RGB ratio (R:G:B) of the captured image data, and calculate or update the color temperature.

In the case in which the newly detected RGB ratio "R:G:B" is largely different from the set emission ratio "Lr:Lg:Lb" of the emissions of the LEDs 18, it is considered that the surroundings of the object is varied. Therefore, the flow returns to step A1, and the light quantities of the LEDs 18 are newly set depending on the change in the surroundings. When the color property of the external light drastically changes, for example, a rapid change in weather, or the user stepping out of doors (or vice versa), the color property of the auxiliary light may automatically be changed.

Other embodiments of the image capture apparatus according to the present invention will be described. The same portions as those of the first embodiment will be indicated in the same reference numerals and their detailed description will be omitted. The configuration of the digital camera according to the following embodiments is illustrated in the block diagram shown in FIG. 1.

Second Embodiment

Hereinafter, still image capture processing according to the second embodiment will be described.

Figure 3:
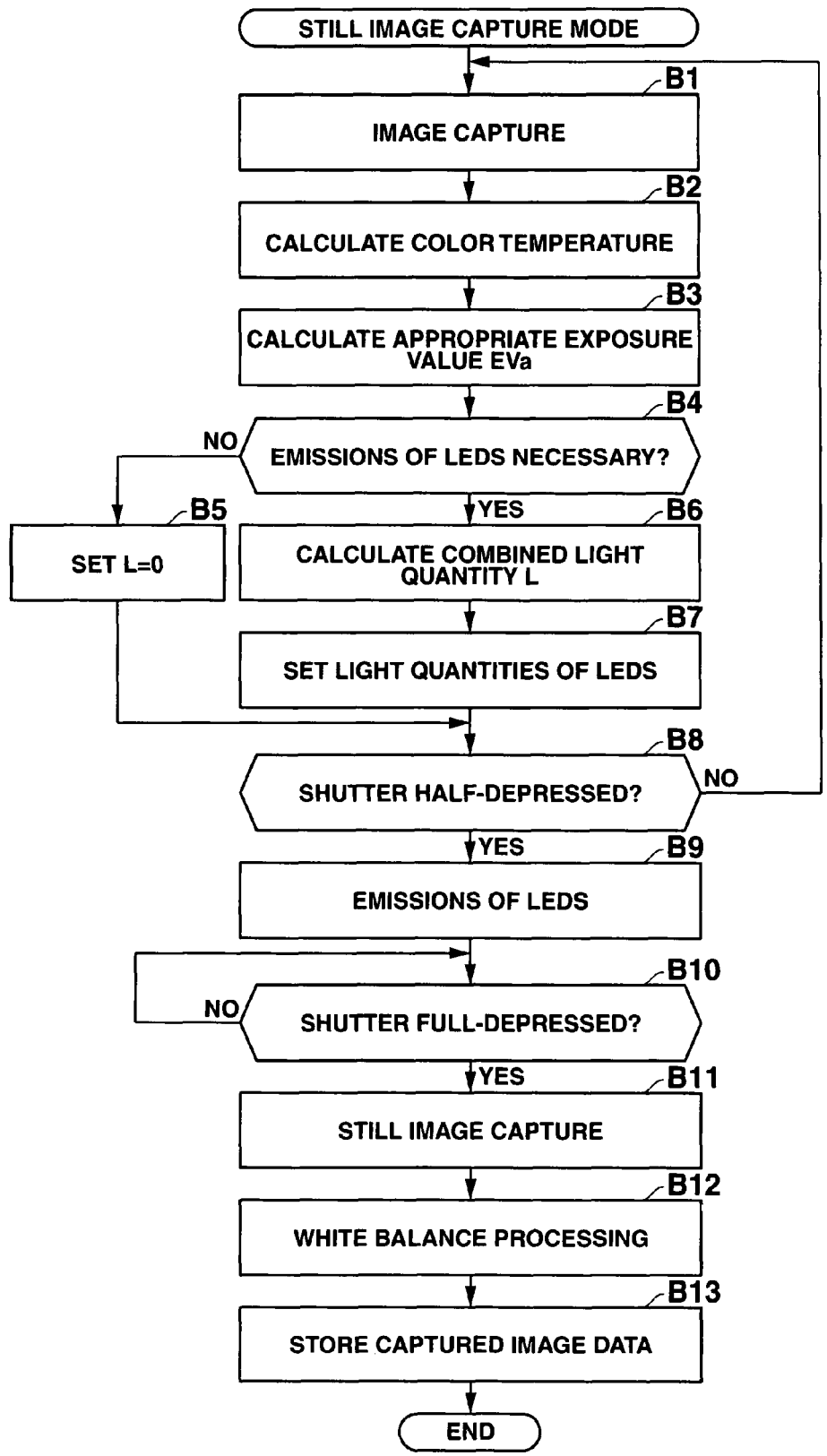
FIG. 3 is a flowchart illustrating still image capture processing of the digital camera 1 according to the second embodiment.

FIG. 3 is a flowchart of the still image capture processing according to the present embodiment.

In the flowchart depicted in FIG. 3, the processing from step B1 to step B4 is the same as the processing from step A1 to step A4 in FIG. 2, the explanation about steps B1 to B4 is omitted. Note that the moving image capture processing depicted in FIG. 2 starts on setting of the moving image capture mode; however, the still image capture processing depicted in FIG. 3 starts on setting of the still image capture mode.

In step B4, the CPU 11 determines whether or not the emissions of the LEDs 18r, 18g, and 18b are required to obtain the calculated appropriate exposure value EVa.

When the appropriate exposure value EVa can be obtained by use of the set shutter speed and the set aperture, the CPU 11 determines that the light emissions by the LEDs 18 are not necessary (NO in step B4). When it is determined that the emissions of the LEDs 18 are not necessary, the combined light quantity L by the LEDs 18 is set to zero (step B5). Namely, the setting is performed such that the LEDs 18 may not emit the lights.

When it is determined that the light emissions by the LEDs 18 are necessary (YES in step B4), the CPU 11 calculates the combined light quantity L (step B6). The combined light quantity L of the LEDs 18 is obtained depending on the difference between the appropriate exposure value EVa calculated at step B3 and the exposure value EVb realized by the shutter speed and aperture set at step B3.

The light quantities Lr, Lg, and Lb of the emissions by the LEDs 18r, 18g, and 18b are set respectively (step B7). The setting of the light quantities is performed so that the emission ratio "Lr:Lg:Lb" coincides with the RGB ratio "R:G:B" detected by the color temperature calculator at step B2.

The CPU 11 determines whether or not the shutter button is half-depressed (step B8). When it is determined that the shutter button is not half-depressed (NO in step B8), the flow returns to step B2. The light quantities of the LEDs 18 are newly set based on the captured image data (steps B2 to B7).

When the shutter button is half-depressed (YES in step B8), the LED driver 17 causes the LEDs 18r, 18g, and 18b to respectively emit the lights at the set light quantities Lr, Lg, and Lb, under the control of the CPU 11 (step B9). That is, the CPU 11 controls the light emissions of the LEDs 18 in such a manner that when the red, green, and blue rights emitted by the LEDs 18 are combined, the combined light has the same color property as the color property of the external light which irradiates the object without the emissions by the LEDs 18. The light emissions by the LEDs 18 do not affect the white balance processing.

Thereafter, the CPU 11 determines whether or not the shutter button is full-depressed (step B10).

When the shutter button is full-depressed (YES in step B10), the CCD 5 captures a frame of the image data of the object (step B11).

The white balance processing is executed on the captured image data (step B12). The signal amplifier in the WB processor 9 amplifies the RGB signal based on the RGB gains which are set according to the color temperature. Since the color property of the combination of the lights emitted by the LEDs 18 matches the color property of the external light, the auxiliary light (emissions by the LEDs 18) does not affect the color property of the captured image data.

The image data subjected to the white balance processing is sent to the image generator 10 to be converted into the YUV data, and temporally stored in the DRAM 14 (step 13).

The image data temporally stored in the DRAM 14 is compressed under the control of the CPU 11 to be recorded in the flash memory 15 as a still image file in a predetermined format (e.g., JPEG format).

Third Embodiment

In the first and second embodiments, the light quantities emitted by the LEDs 18 are controlled so that the color temperature of the combination of the lights emitted by the LEDs 18 coincides with the color temperature of the external light. However, the setting of the color temperature of the combined light is not limited to the way described in the above embodiments. An embodiment for setting arbitrarily the color temperature of the combined light emitted by the LEDs 18 will be described hereinafter.

In the present embodiment, light emission modes, such as an "external light mode", a "natural light mode", an "arbitrary light mode", and a "complementary color mode" are prepared. In the case in which the "external light mode" is set, similarly to the first and second embodiments, the LEDs 18 are caused to emit the lights so that the color temperature of the combination of the emitted lights coincides with the color temperature of the external light. In the case in which the "natural light mode" is set, the LEDs 18 are caused to emit the lights so that the color temperature of the combination of the emitted lights becomes equal to a color temperature of a natural light (white light). When the "arbitrary light mode" is set, the LEDs 18 are caused to emit the lights so that the color temperature of the combination of the emitted lights becomes equal to the color temperature selected by the user. When the "complementary color mode" is set, the LEDs 18 are caused to emit the lights so that the colors in the captured image may be the complementary colors of an image captured with the auxiliary light having the color temperature calculated at step C2.

Also in the present embodiment, the digital camera 1 having the configuration shown in FIG. 1 is utilized as the image capture apparatus.

Hereinafter, moving image capture processing of the digital camera 1 according to the present embodiment will be described with reference to the flowcharts of FIG. 4 and FIG. 5.

Figure 4:
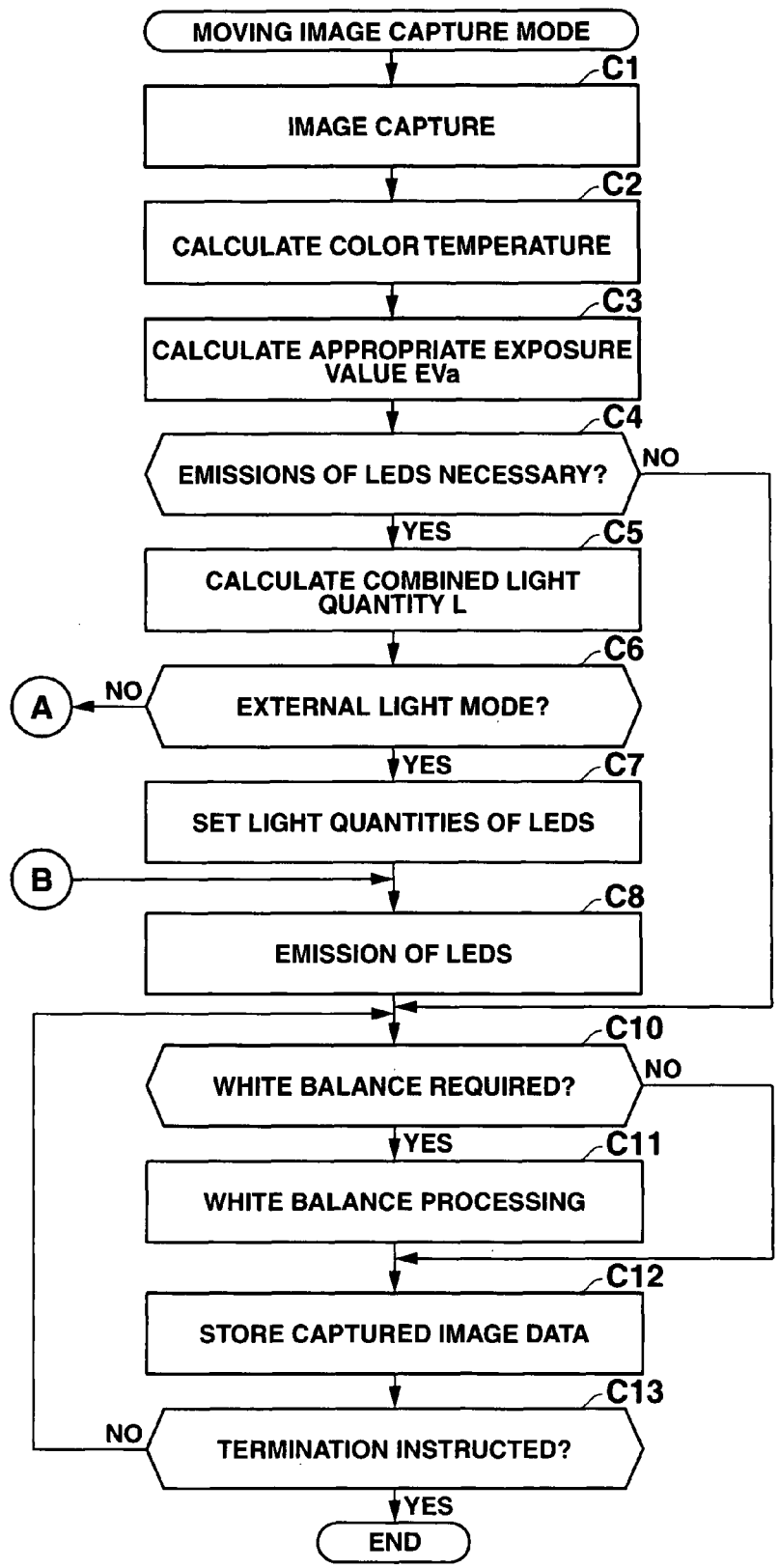
FIG. 4 is a flowchart illustrating moving image capture processing of the digital camera 1 according to the third embodiment.

In the flowchart shown in FIG. 4, the processing from step C1 to step C4 is the same as the processing of the steps A1 to A4 in the flowchart of FIG. 2, the explanation about steps C1 to C4 will be omitted.

In step C4, the CPU 11 determines whether or not the emissions of the LEDs 18 are required to obtain the calculated appropriate exposure value EVa.

When the appropriate exposure value EVa can be obtained by use of the set shutter speed and the aperture, the CPU 11 determines that the light emissions by the LEDs 18 are not necessary (NO in step C4). When it is determined that the emissions of the LEDs 18 are not needed, the flow advances to step C10 to determine whether or not the white balance processing is required.

When it is determined that the light emissions by the LEDs 18 are necessary (YES in step C4), the CPU 11 calculates the combined light quantity L of the LEDs 18 (step C5). The combined light quantity L of the LEDs 18 is calculated depending on the difference between the appropriate exposure value EVa calculated at step C3 and the exposure value EVb realized by the set shutter speed and the set aperture set at step C3.

The CPU 11 determines whether or not the "external light mode" is set (step C6). The user may preliminarily set the light emission mode of the movie light to any one of the "external light mode", "natural light mode", "arbitrary light mode", and "complementary color mode". The CPU 11 makes a determination in accordance with the setting predetermined by the user. In the case in which the "arbitrary light mode" is set, the user also presets the color temperature (or, other index which indicates the color temperature).

When it is determined that the "external light mode" is set (YES in step C6), the CPU 11 sets the light quantities Lr, Lg, and Lb of the LEDs 18r, 18g, and 18b in the same manner as mentioned in the first and second embodiments (step C7). The CPU 11 sets the light quantities of the LEDs 18 in such a manner that the emission ratio "Lr:Lg:Lb" of the light emissions coincides with the RGB ratio "R:G:B" detected by the color temperature calculator at step C2. Namely, the CPU 11 sets the emission ratio "Lr:Lg:Lb" so that the color temperature of the combination of the lights emitted by the LEDs 18 matches the color temperature of the external light.

Figure 5:
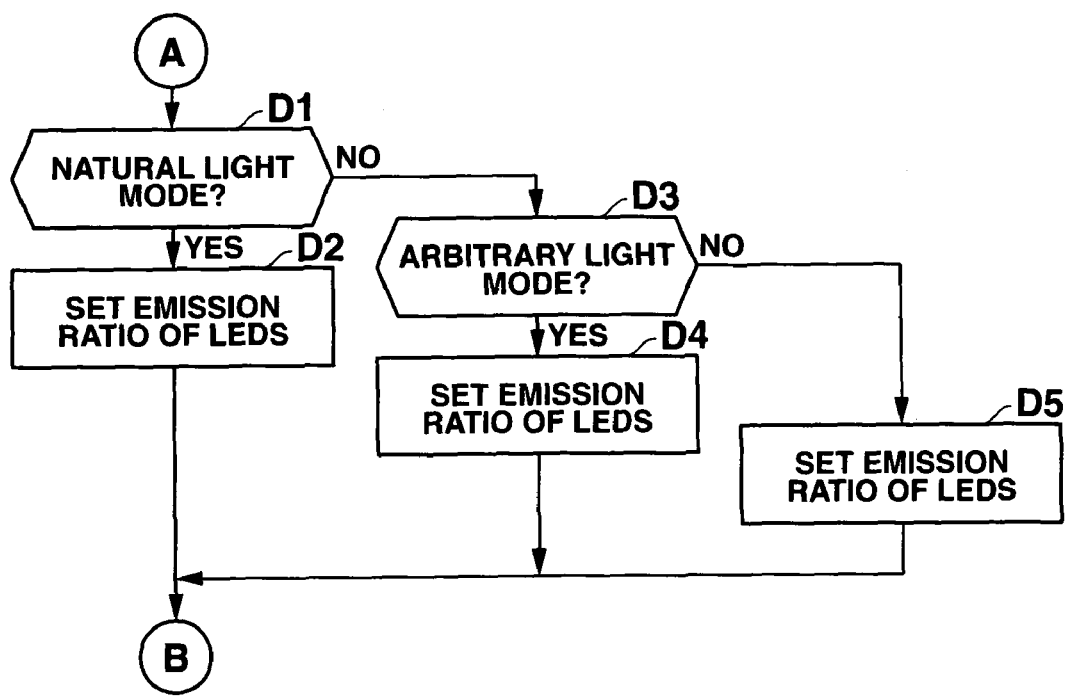
FIG. 5 is a flowchart illustrating moving image capture processing of the digital camera 1 according to the third embodiment.

On the other hand, when it is determined that the "external light mode" is not set (NO in step C6), the flow advances to step D1 of the flowchart in FIG. 5.

The CPU 11 determines whether or not the "natural light mode" is set (step D1).

When the CPU 11 determines that the "natural light mode" is set (YES in step D1), the CPU 11 sets the light quantities Lr, Lg, and Lb of the LEDs 18 so that the color temperature of the combination of the lights emitted by the LEDs 18r, 18g, and 18b coincides with the color temperature of the natural light (white light) (step D2). The light quantities of the LEDs 18 are set in such a manner that the emission ratio "Lr:Lg:Lb" becomes equivalent to the RGB ratio "Rn:Gn:Bn" of the natural light. The flow advances to step C8 of the flowchart in FIG. 4.

On the other hand, when the CPU 11 determines that the "natural light mode" is not set (NO in step D1), the CPU 11 determines whether or not the "arbitrary light mode" is set (step D3).

When the "arbitrary light mode" is set (YES in step D3), the CPU 11 sets the light quantities Lr, Lg, and Lb of the LEDs 18 so that the color temperature of the combination of lights emitted by the LEDs 18$r$, 18$g$, and 18$b$ coincides with the color temperature set by the user (step D4). The light quantities of the LEDs 18 is set in such a manner that the emission ratio "Lr:Lg:Lb" becomes equivalent to the RGB ratio "Ru:Gu:Bu" corresponding to the color temperature preset by the user. The flow advances to step C8 of the flowchart in FIG. 4.

In contrast, when the CPU 11 determines that the "arbitrary light mode" is not set (NO in step D3), the CPU 11 determines that the "complementary color mode" is set. The CPU 11 sets the light quantities Lr, Lg, and Lb of the LEDs 18 in such a manner that the relation between the colors in the image captured with the emissions of the LEDs 18 and the colors in the image captured with the auxiliary light having the color temperature calculated at step C2 is brought into complementary (step D5). Then, the flow proceeds to step C8 of FIG. 4.

When the combination of the lights having colors which are complementary to each other is emitted, the combination of the lights is equivalent to the natural light (white light). That is, the combination of two kinds of light in the complementary color relation generates the white light.

When the setting of the light quantities Lr, Lg, and Lb of the LEDs 18 is performed, the CPU 11 causes the LEDs 18 to emit the lights on the basis of the set emission ratio "Lr:Lg:Lb" (step C8). When the "external light mode" is set, the combination of the lights is emitted such that the color temperature of the combination of the lights is equivalent to the color temperature of the external light irradiating the object. When the "natural light mode" is set, the combination of the lights is emitted in such a manner that the color temperature of the combination of the lights is equivalent to the color temperature of the natural light. When the "arbitrary light mode" is set, the combination of the lights is emitted in such a manner that the color temperature of the combination of the lights is equivalent to the color temperature preset by the user. When the "complementary color mode" is set, the combination of the lights having the colors complementary to the external light can be emitted.

Sequentially, the CPU 11 determines whether or not the white balance processing is required (step C10). The user may preliminarily set whether or not to execute the white balance processing by means of the operation of the input unit 12. The CPU 11 determines the necessity of the white balance processing in accordance with the setting made by the user.

When it is determined that the white balance processing is required to be executed (YES in step C10), the signal amplifier of the WB processor 9 performs the white balance processing based on the color temperature calculated by the color temperature calculator at step C2.

The image data subjected to the white balance processing is sent to the image generator 10 and converted into the YUV data to be temporarily stored in the DRAM 14 (step C12).

Until the user instructs the termination of the moving image capture processing (YES in step C13), the processing from step C10 to step C12 is executed repeatedly.

Moreover, when the emissions of the LEDs 18 are executed in the "natural light mode" or "complementary color mode", the white balance processing may not be performed at step C11. When the emissions of the LEDs 18 are executed in the "arbitrary light mode", the white balance processing may be executed based on the color temperature set by the user.

To execute or not to execute the white balance processing at step C11 may be determined based on the ratio between the combined light quantity L of the LEDs 18 and the light quantity of the external light. For example, in the "natural light mode" or "complementary color mode", when the combined light quantity L of the LEDs 18 is smaller than the light quantity of the external light, the white balance processing may be executed on the basis of the color temperature of the external light, and when the combined light quantity L of the LEDs 18 is larger than the light quantity of the external light, the white balance processing may not be executed. In the "arbitrary light mode", when the combined light quantity L of the LEDs 18 is smaller than the light quantity of the external light, the white balance processing may be executed based on the color temperature of the external light, and when the combined light quantity L of the LEDs 18 is larger than the light quantity of the external light, the white balance processing may be executed based on the color temperature set by the user.

The light emission mode may be set based on whether or not the white balance processing is set to be executed. For example, when the white balance is set to be executed, the light emission mode is automatically set to the "external light mode", and when the white balance is set not to be executed, the light emission mode may automatically set to the "complementary color mode" or the "natural light mode".

As mentioned above, in the present embodiment, the user sets to or not to execute the white balance processing, and sets the light emission mode. Since the light emissions by the LEDs 18 and the white balance processing are controlled based on the setting made by the user, the color balance of the captured image can be adjusted to the color balance desired by the user. For instance, when capturing the image of the object at sunset, to obtain the image in which the red of the setting sun is emphasized, the light emission mode should be set to the "external light mode" without the white balance processing. The user can obtain the image having red cast due to the setting sun. When capturing the image in the evening, to obtain a whitish image having brightness like an image captured in the daytime, the light emission mode is to be set to the "external light mode", or the "natural light mode" with the white balance processing. Thereby, the color balance of the captured image can be adjusted as if the image is captured in the daytime (when the "natural light mode" is set, the white balance processing may not be executed). Moreover, to obtain the image in which the surroundings of the object are further emphasized, the light emission mode should be set to the "arbitrary light mode" without the white balance processing. Thereby, the user can obtain the image with the desired color balance.

Fourth Embodiment

Similarly to the third embodiment, light emission modes, such as an "external light mode", "natural light mode", "arbitrary light mode" and "complementary color mode" may be prepared in the still image capture mode.

In the still image capture processing having a plurality of light emission modes according to the present embodiment can be described by referring to the FIG. 3 of the flowchart showing the still image capture processing and FIGS. 4 and 5 of the flowcharts showing the moving image capture processing. However, in the flowchart illustrated in FIG. 3, the processing of step B7 is replaced by the processing of steps C6 and C7 in FIG. 4 and the processing of steps D1 to D5 in FIG. 5.

In the still image capture processing according to the present embodiment, to set the light quantities Lr, Lg, and Lb, the setting of the light emission mode is detected similarly to the third embodiment (steps C6 and C7 in FIG. 4, and steps D1 to D5 in FIG. 5). Thereafter, the LEDs 18 are caused to emit the lights and the image of the object is capture in response to the shutter button operation.

Modified Examples

The embodiments given above may be modified as follows.

(1) In the embodiments described above, the color temperature of the combination of the lights emitted by the LEDs 18 is adjusted by varying the currents of the respective LEDs 18r, 18g, and 18b. However, the color temperature of the combination of the lights emitted by the LEDs 18 may be adjusted in such a manner that a plurality of red LEDs (18r), a plurality of green LEDs (18g), and a plurality of blue LEDs (18b) are provided, and for the each color component, the number of the LEDs to be emitted is controlled.

(2) In the embodiments mentioned above, the LEDs are used as light emitting elements. However, the light emitting element is not limited to the LED. Another light emitting element is usable.

(3) In the embodiments mentioned above, the color temperature is calculated from the image data. However, not only the color temperature but also a stimulus value, a chromaticity coordinate, or a color distribution property may be calculated. The emissions by the LEDs 18 may be adjusted such that the combination of the lights emitted by the LEDs 18 corresponds to the calculated chromaticity coordinate or color distribution property. An index to be calculated may be any index which can represent the color property of the external light.

(4) In the embodiments given above, the CCD 5 is equipped with an RGB filter (Bayer filter). However, the CCD 5 may be equipped with another filter (e.g., CYM filter).

(5) In the third embodiment, it may be determined by the user whether or not the LEDs 18 emit the lights. Only when the user sets the LEDs 18 to emit the lights, the emissions of the LEDs 18 are performed. When it is determined that the LEDs 18 do not emit the lights, the gains used for the AGC processing performed in the unit circuit 8 are adjusted for correction of the brightness. Thereby, when capturing the image with the light emissions of the LEDs 18, the noise contained in the captured image is reduced, even when the object is not bright. When correcting the brightness by adjusting the gains and without the emissions of the LEDs 18, the power consumption is suppressed.

(6) In the aforementioned embodiments, the case in which the present invention is applied to the digital camera 1 is described. However, the present invention is not limited to the above case, and may be also applied to other image capturing apparatus having a function of emitting an auxiliary light, such as, a mobile telephone with a camera function, a personal digital assistant (PDA) with a camera function, a personal computer with a camera function, an IC recorder with a camera function, and a digital video camera.

What is claimed is:

1. An image capture apparatus comprising:
   an image capture unit configured to capture an image of an object and output image data;
   a light emitting unit comprising light emitting elements configured to respectively emit lights of different colors;
   an obtaining unit configured to obtain a color property of a light source irradiating the object;
   a first calculation unit configured to calculate an appropriate exposure value based on a brightness component of the image data output from the image capture unit;
   a second calculation unit configured to calculate a combined light quantity to be emitted by the light emitting elements based on the appropriate exposure value calculated by the first calculation unit;
   a first emission controller configured to control the light emitting unit based on the combined light quantity calculated by the second calculation unit and such that a color of the lights of different colors emitted by the light emitting elements matches the color property of the light source obtained by the obtaining unit;
   a white balance unit configured to perform a white balance adjustment such that a white balance of the image data output from the image capture unit is adjusted based on the color property of the light source obtained by the obtaining unit; and
   a control unit configured to:
     store image data subjected to the white balance adjustment by the white balance unit into a storage unit when the combined light quantity calculated by the second calculation unit is smaller than a quantity of an external light, and
     store the image data output from the image capture unit into the storage unit without being subjected to the white balance adjustment by the white balance unit when the combined light quantity calculated by the second calculation unit is not smaller than the quantity of the external light.

2. The image capture apparatus according to claim 1, further comprising:
   a determination unit configured to determine whether or not an image capture is instructed by a user; and
   wherein the control unit is configured to control the storage unit to store the image data subjected to the white balance adjustment when the determination unit determines that the image capture is instructed by the user.

3. The image capture apparatus according to claim 1, wherein the white balance unit performs color balance adjustment such that a color balance of the image data captured under the light source whose color property is obtained by the obtaining unit gets closer to a color balance of image data captured under natural light.

4. The image capture apparatus according to claim 1, wherein the obtaining unit obtains at least one of a color temperature, a chromaticity coordinate, and a color distribution property of the light source as the color property based on the image data output from the image capture unit.

5. The image capture apparatus according to claim 1, wherein the light emitting unit includes a light emitting element which emits red light, a light emitting element which emits green light, and a light emitting element which emits blue light.

6. The image capture apparatus according to claim 1, wherein the light emitting elements comprise light emitting diodes.

7. The image capture apparatus according to claim 1, further comprising:
   an input unit configured to input the color property.

8. The image capture apparatus according to claim 1, further comprising:
   a second emission controller configured to control the light emitting unit based on the combined light quantity calculated by the second calculation unit and such that a color of the lights of different colors emitted by the light emitting elements matches one of a natural light, and a complementary color of the color property of the light source obtained by the obtaining unit; and a selector configured to select one of the first emission controller and the second emission controller.

9. The image capture apparatus according to claim 8, further comprising:

a third emission controller configured to control the light emitting unit based on a user setting; and wherein the selector is configured to select one of the first emission controller, the second emission controller, and the third emission controller.

10. The image capture apparatus according to claim 9, wherein the first, the second, and the third emission controllers control the light emission by adjusting currents of the light emitting elements for respective color components.

11. The image capture apparatus according to claim 9, wherein the first, the second, and the third emission controllers control the light emission by adjusting a total number of light emitting elements for each color component.

12. The image capture apparatus according to claim 9, wherein the control unit is configured to:

control not to perform the white balance adjustment by the white balance unit when the selector selects the second emission controller and the combined light quantity calculated by the second calculation unit is not smaller than the quantity of the external light, and control to perform a white balance adjustment based on the user setting when the selector selects the third emission controller and the combined light quantity calculated by the second calculation unit is not smaller than the quantity of the external light.

13. A computer readable recording medium having a computer program stored thereon that is executable by a computer of an image capture apparatus which comprises an image capture unit configured to capture an image of an object and output image data and a light emitting unit having light emitting elements configured to respectively emit lights of different colors, said program controlling the image capture apparatus to perform functions comprising:

capturing the image of the object and outputting the image data;

obtaining a color property of a light source irradiating the object;

calculating an appropriate exposure value based on a brightness component of the image data output from the image capture unit;

calculating a combined light quantity to be emitted by the light emitting elements based on the calculated appropriate exposure value;

controlling the light emitting unit based on the calculated combined light quantity and such that a color of the lights of different colors emitted by the light emitting elements matches the obtained color property of the light source; and performing a white balance adjustment such that a white balance of the image data output from the image capture unit is adjusted based on the obtained color property of the light source;

wherein when the calculated combined light quantity is smaller than a quantity of an external light, controlling to store image data subjected to the white balance adjustment based on the obtained color property of the light source into a storage unit; and wherein when the calculated combined light quantity is not smaller than the quantity of the external light, controlling to store the image data output from the image capture unit into the storage unit without subjecting the image data to the white balance adjustment based on the obtained color property of the light source.

* * * * *